(12) United States Patent  
Sakurai (10) Patent No.: US 8,228,516 B2  
(45) Date of Patent: Jul. 24, 2012

(54) IMAGE FORMATION DEVICE AND COMPUTER-READABLE RECORD MEDIUM

(75) Inventor: Kunihiko Sakurai, Gifu (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 904 days.

(21) Appl. No.: 12/243,249

(22) Filed: Oct. 1, 2008

(65) Prior Publication Data

US 2009/0086249 A1 Apr. 2, 2009

(30) Foreign Application Priority Data

Oct. 1, 2007 (JP) ................... 2007-258118

(51) Int. Cl.
*G06F 3/12* (2006.01)
*H04N 1/393* (2006.01)

(52) U.S. Cl. ........................ 358/1.13; 358/451

(58) Field of Classification Search .............. 358/1.13, 358/400, 401, 451, 452; 382/298
See application file for complete search history.

(56) References Cited

U.S. PATENT DOCUMENTS

| | | | | |
|---|---|---|---|---|
| 7,738,737 B2 * | 6/2010 | Itonori et al. | ............... | 382/298 |
| 2004/0057634 A1 * | 3/2004 | Mutoh | ...................... | 382/298 |
| 2005/0052676 A1 | 3/2005 | Masumoto et al. | | |
| 2006/0181565 A1 * | 8/2006 | Arazaki | ...................... | 347/19 |
| 2007/0019864 A1 * | 1/2007 | Koyama et al. | ............... | 382/218 |
| 2007/0052981 A1 * | 3/2007 | Shirai | ...................... | 358/1.2 |

FOREIGN PATENT DOCUMENTS

| | | |
|---|---|---|
| JP | 6-333015 | 12/1994 |
| JP | 8-029881 | 2/1996 |
| JP | 2005-066986 | 3/2005 |
| JP | 2009-126171 | * 6/2011 |

* cited by examiner

*Primary Examiner* — Jerome Grant, II (74) *Attorney, Agent, or Firm* — Scully, Scott, Murphy & Presser, P.C.

(57) ABSTRACT

An image formation device capable of forming a plurality of reduced images on an output medium comprises an input data acquisition unit which acquires input data, a recognizability judgment unit which judges whether each reduced image to be formed corresponding to each piece of input data acquired by the input data acquisition unit is recognizable to a user or not based on the input data and size of the reduced image to be formed, and a reduced image formation unit which forms the reduced images that are judged to be recognizable by the recognizability judgment unit on the output medium while prohibiting the formation of the reduced images that are judged to be unrecognizable by the recognizability judgment unit.

19 Claims, 8 Drawing Sheets

IMAGE FORMATION DEVICE AND COMPUTER-READABLE RECORD MEDIUM

CROSS-REFERENCE TO RELATED APPLICATION

This application claims priority under 35 U.S.C. §119 from Japanese Patent Application No. 2007-258118 filed on Oct. 1, 2007. The entire subject matter of the application is incorporated herein by reference.

BACKGROUND

1. Technical Field

The present invention relates to an image formation device capable of forming a plurality of reduced images on an output medium, and a computer-readable record medium to be used for implementing such an image formation device.

2. Prior Art

Image formation devices (printers, personal computers, etc.) capable of the so-called "index printing" are widely known (e.g. Japanese Patent Provisional Publication No. 2005-66986). For example, the user of a digital camera can pull out a memory card (storing image data of pictures (photos) shot with the camera) from the camera, insert the memory card into a card slot of a printer having the index printing function, and properly operate the printer to make the printer carry out the index printing. In the index printing, the so-called index images or thumbnail images (as reduced images of the image data of the pictures) are printed on a sheet (e.g. paper) in a prescribed layout. The index printout allows the user to view a large number of pictures at once and with ease, select pictures that should be printed out, check each picture before the printing, etc.

SUMMARY OF THE INVENTION

However, there are cases where such a memory card used for the index printing contains not only picture data (photo data) but also document data that have been created with document preparation software (word processing software), for example. In such cases where data made up almost exclusively of characters have been stored in the memory card, the printer is necessitated to waste a lot of processing time on the preparation of index images of such data even though the index images of such data (made up almost exclusively of characters) are almost useless to the user for recognizing the contents of the data.

The present invention, which has been made in consideration of the above problem, is advantageous in that an image formation device, capable of forming reduced images that are highly useful for visually checking the contents of input data while also saving its processing time, can be provided. The present invention also provides a computer-readable record medium to be used for implementing such an image formation device.

In accordance with an aspect of the present invention, there is provided an image formation device capable of forming a plurality of reduced images on an output medium, comprising an input data acquisition unit which acquires input data, a recognizability judgment unit which judges whether each reduced image to be formed corresponding to each piece of input data acquired by the input data acquisition unit is recognizable to a user or not based on the input data and size of the reduced image to be formed, and a reduced image formation unit which forms the reduced images that are judged to be recognizable by the recognizability judgment unit on the output medium while prohibiting the formation of the reduced images that are judged to be unrecognizable by the recognizability judgment unit.

In the image formation device configured as above, the reduced images that are judged to be recognizable by the recognizability judgment unit are formed on the output medium by the reduced image formation unit, while the formation of the reduced images that are judged to be unrecognizable by the recognizability judgment unit is prohibited by the reduced image formation unit, by which resources (processing time, inks, etc.) of the image formation device are prevented from being wasted on the formation of reduced images that are unrecognizable to the user. Consequently, reduced images highly useful for visually checking the contents of the input data can be formed on the output medium, while also saving the processing time, etc.

In this specification and the appended claims, the expression "forming a plurality of reduced images on an output medium" can mean any kind of operation as long as a plurality of reduced images can be formed on one output medium so as to let the user visually recognize the multiple reduced images at once. For example, the above expression can include not only the printing (formation) of the reduced images on a sheet (an example of the "output medium") by use of color materials (inks, toners, etc.) but also the displaying (formation) of the reduced images on a display device (an example of the "output medium") capable of displaying images, characters, figures, etc. In the case where the reduced images are formed (printed) by use of color materials, the consumption of the color materials (inks, toners, etc.) can be reduced by the image formation device configured as above.

In this specification and the appended claims, the expression "based on size of the reduced image to be formed" can mean not only based on the actual size of the reduced image but also based on a parameter regarding the size of the reduced image, such as the number of reduced images to be formed on the output medium or the reduction ratio of the reduced image.

In accordance with another aspect of the present invention, there is provided an image formation device capable of forming a plurality of reduced images on an output medium, comprising an input data acquisition unit which acquires input data, a first judgment unit which judges whether each piece of input data acquired by the input data acquisition unit includes font data or not, and a reduced image formation unit which forms reduced images corresponding to the input data that are judged to include no font data by the first judgment unit on the output medium while prohibiting the formation of reduced images corresponding to the input data that are judged to include font data by the first judgment unit.

In the image formation device configured as above, reduced images corresponding to the input data that are judged to include no font data are formed on the output medium, while the formation of reduced images corresponding to the input data that are judged to include font data is prohibited, by which the resources (processing time, inks, etc.) of the image formation device are prevented from being wasted on the formation of reduced images (containing character strings) that are hardly recognizable to the user. Consequently, reduced images highly useful for visually checking the contents of the input data can be formed on the output medium, while also saving the processing time, etc.

In accordance with another aspect of the present invention, there is provided an image formation device capable of acquiring multiple pieces of input data and forming a plurality of reduced images corresponding to the multiple pieces of input data on an output medium, comprising an acquisition judgment unit, a reduced image acquisition unit, an image formation unit and a recognizability judgment unit. The acquisition judgment unit judges whether reduced image data necessary for the formation of each reduced image corresponding to each of the multiple pieces of input data is acquirable or not. The reduced image acquisition unit acquires the reduced image data when the reduced image data is judged to be acquirable by the acquisition judgment unit. The image formation unit forms the reduced image on the output medium according to the reduced image data when the reduced image data is acquired by the reduced image acquisition unit. The recognizability judgment unit judges whether each reduced image to be formed corresponding to each of the multiple pieces of input data is recognizable to a user or not based on the input data and size of the reduced image to be formed, when the reduced image data necessary for the formation of the reduced image is judged not to be acquirable by the acquisition judgment unit. The image formation unit includes a reduced image formation unit which forms the reduced images that are judged to be recognizable by the recognizability judgment unit on the output medium while prohibiting the formation of the reduced images that are judged to be unrecognizable by the recognizability judgment unit.

In the image formation device configured as above, the reduced images that are judged to be recognizable by the recognizability judgment unit are formed on the output medium by the reduced image formation unit, while the formation of the reduced images that are judged to be unrecognizable by the recognizability judgment unit is prohibited by the reduced image formation unit, by which resources (processing time, inks, etc.) of the image formation device are prevented from being wasted on the formation of reduced images that are unrecognizable to the user. Consequently, reduced images highly useful for visually checking the contents of the input data can be formed on the output medium, while also saving the processing time, etc. Further, whether the reduced image data (necessary for the formation of each reduced image corresponding to each piece of input data) is acquirable or not is judged by the acquisition judgment unit, and when the reduced image data is judged to be acquirable, the reduced image data is acquired by the reduced image acquisition unit and the reduced image is formed on the output medium according to the acquired reduced image data, by which the processing time can be saved compared to cases where the judgment on the recognizability of the reduced image is made for all pieces of input data (and all the necessary reduced image data are generated by the image formation device).

In accordance with another aspect of the present invention, there is provided a computer-readable record medium storing computer-readable instructions that cause a computer to function as an input data acquisition unit which acquires input data, a recognizability judgment unit which judges whether each reduced image to be formed and outputted by an output unit corresponding to each piece of input data acquired by the input data acquisition unit is recognizable to a user at the point of the output or not based on the input data and size of the reduced image to be formed, and a control unit which makes the output unit form and output the reduced images that are judged to be recognizable by the recognizability judgment unit while prohibiting the formation of the reduced images that are judged to be unrecognizable by the recognizability judgment unit.

In accordance with another aspect of the present invention, there is provided a computer-readable record medium storing computer-readable instructions that cause a computer to function as an input data acquisition unit which acquires input data, a first judgment unit which judges whether each piece of input data acquired by the input data acquisition unit includes font data or not, and a control unit which makes an output unit form and output reduced images of the input data that are judged to include no font data by the first judgment unit while prohibiting the formation of reduced images of the input data that are judged to include font data by the first judgment unit.

In accordance with another aspect of the present invention, there is provided a computer-readable record medium storing computer-readable instructions that cause a computer to function as an input data acquisition unit, an acquisition judgment unit, a reduced image acquisition unit, a control unit and a recognizability judgment unit. The input data acquisition unit acquires input data. The acquisition judgment unit judges whether reduced image data necessary for formation of each reduced image corresponding to each piece of input data is acquirable or not. The reduced image acquisition unit acquires the reduced image data when the reduced image data is judged to be acquirable by the acquisition judgment unit. The control unit makes an output unit form the reduced image according to the reduced image data when the reduced image data is acquired by the reduced image acquisition unit. The recognizability judgment unit judges whether each reduced image to be formed corresponding to each piece of input data is recognizable to a user or not based on the input data and size of the reduced image to be formed, when the reduced image data necessary for the formation of the reduced image is judged not to be acquirable by the acquisition judgment unit. The control unit makes the output unit form the reduced images that are judged to be recognizable by the recognizability judgment unit while prohibiting the formation of the reduced images that are judged to be unrecognizable by the recognizability judgment unit.

With the above computer-readable record media, effects similar to those of the aforementioned image formation devices can be achieved, by making a computer operate according to the computer-readable instructions obtained (loaded, installed, etc.) from the record media.

Other objects, features and advantages of the present invention will become more apparent from the consideration of the following detailed description taken in conjunction with the accompanying drawings.

DETAILED DESCRIPTION OF THE EMBODIMENTS

Referring now to the drawings, a description will be given in detail of preferred embodiments in accordance with the present invention.

Embodiment 1

Figure 1:
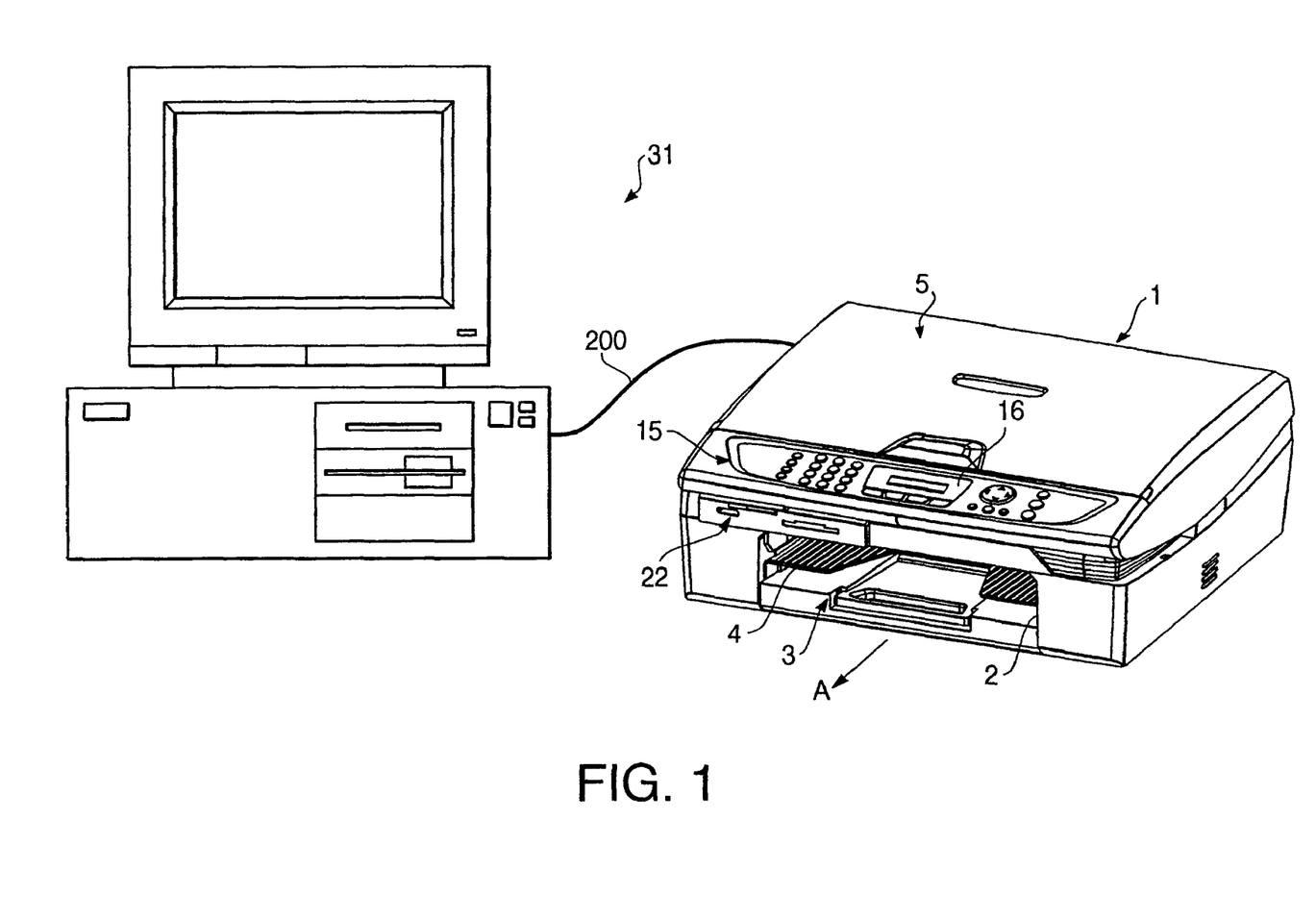
FIG. 1 is a schematic diagram showing the external appearance of an image formation device in accordance with a first embodiment of the present invention and its connection with a PC (Personal Computer).

FIG. 1 is a schematic diagram showing the external appearance of an image formation device 1 in accordance with a first embodiment of the present invention and its connection with a PC (Personal Computer) 31.

The image formation device 1 of the first embodiment is configured as a so-called MFP (Multi-Function Peripheral), having the printer function, scanner function, copy function, facsimile transmission/reception function, etc. integrated in one body. The image formation device 1 also has the index printing function of forming (printing) multiple index images (reduced images) of data stored in a memory card inserted in its memory card slot 22 (input data) on a sheet (e.g. paper) in a prescribed layout.

The image formation device 1 of this embodiment is especially capable of forming index images that are highly useful for visually checking the contents of the data on a sheet, while also saving its processing time.

As shown in FIG. 1, the front of the body of the image formation device 1 has an opening 2 which is partitioned into upper and lower parts. Into the lower part of the opening 2, a sheet feed cassette (capable of storing a stack of sheets to be printed on) is inserted. The upper part of the opening 2 serves as a sheet ejection part 4, to which the sheets after being printed on are ejected in the direction of the arrow "A".

A scanner 20 (see FIG. 2) to be used for document scanning, etc. during the execution of the scanner function, copy function, etc. is placed over the upper part of the opening 2. A glass plate (flat bed), on which the user places a document to be scanned, is covered by a document cover 5. For the document scanning, the user opens the document cover 5 upward, places a document on the glass plate, closes the document cover 5 to fix the document on the flat bed, and presses a document scan button which is included in operation keys 15 of the image formation device 1. Then, the image on the (lower) surface of the document is scanned by the scanner 20 operating underneath the glass plate.

The operation keys 15 and an LCD (Liquid Crystal Display) 16 (for displaying menus, operational instructions and current processing status of the image formation device 1) are placed in front of the document cover 5. The user can perform various operations (turning the power ON/OFF, switching/selecting the function, etc.) by pressing the operation keys 15.

A part of the front of the body above the opening and below the operation keys 15 is provided with the memory card slot 22, to which a memory card can be inserted detachably. To a USB I/F (interface) 18 (see FIG. 2) on the back of the body, one end of a USB cable 200 is connected. The other end of the USB cable 200 is connected to a USB I/F 36 of the PC 31 (see FIG. 2). Via the USB cable 200, the image formation device 1 and the PC 31 can perform data communication with each other.

Figure 2:
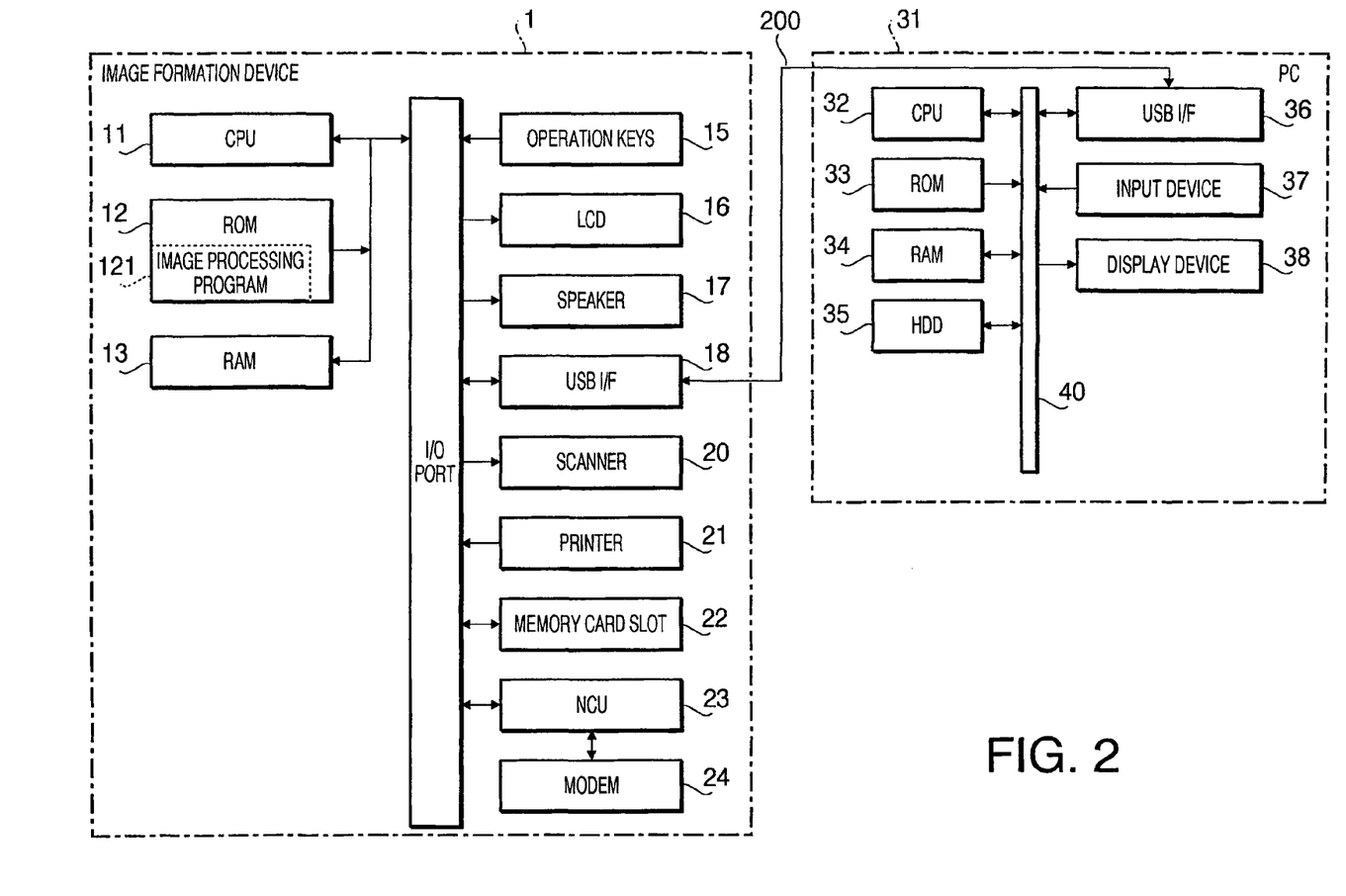
FIG. 2 is a block diagram showing an example of the electrical configuration of the image formation device and the PC.

FIG. 2 is a block diagram showing an example of the electrical configuration of the image formation device 1 and the PC 31. The image formation device 1 includes a CPU (Central Processing Unit) 11, a ROM (Read Only Memory) 12, a RAM (Random Access Memory) 13, the operation keys 15, the LCD 16, a speaker 17, the USB I/F 18, the scanner 20, a printer 21, the memory card slot 22, an NCU (Network Control Unit) 23 and a modem 24 as its main components. In the image formation device 1, the CPU 11, the ROM 12 and the RAM 13 are connected together by a bus line 26. The operation keys 15, the LCD 16, the speaker 17, the USB I/F 18, the scanner 20, the printer 21, the memory card slot 22 and the NCU 23 are connected to the bus line 26 via an I/O (Input/Output) port 27.

The CPU 11 of the image formation device 1 controls the components connected to the I/O port 27 according to programs and data (fixed values) stored in the ROM 12 and the RAM 13. The ROM 12 is a non-rewritable memory prestoring various programs such as an image processing program 121 for the execution of an index image formation process which will be explained later referring to FIG. 4. The RAM 13 is a rewritable memory for temporarily storing various data.

The speaker 17 outputs touch tones of the operation keys 15, warning sounds (announcing the occurrence of an error), etc. The printer 21 is configured as an inkjet printer of a well-known type.

Meanwhile, the PC 31 includes a CPU 32, a ROM 33, a RAM 34, an HDD 35, the USB I/F 36, an input device 37 and a display device 38 as its main components. The components are connected together by a bus line 39.

The CPU 32 controls the other components (connected thereto via the bus line 39) according to programs and data (fixed values) stored in the ROM 33, the RAM 34 and the HDD 35. The ROM 33 is a memory prestoring programs, data, etc. for the control of the operation of the PC 31. The RAM 34 is a rewritable memory for temporarily storing data necessary for the processing by the CPU 32, etc. The HDD 35 is a hard disk drive.

The input device 37 (device for letting the user input instructions, etc.) includes a keyboard and a mouse, for example. The display device 38 (implemented by a CRT display or a liquid crystal display, for example) displays a variety of information regarding processes, inputted data, etc.

The USB I/F 36 is an interface for connecting the PC 31 with an external device such as the image formation device 1. Via the USB I/F 36, the PC 31 can send a print command (based on print data) to the image formation device 1 to make it carry out the image formation.

Figure 3:
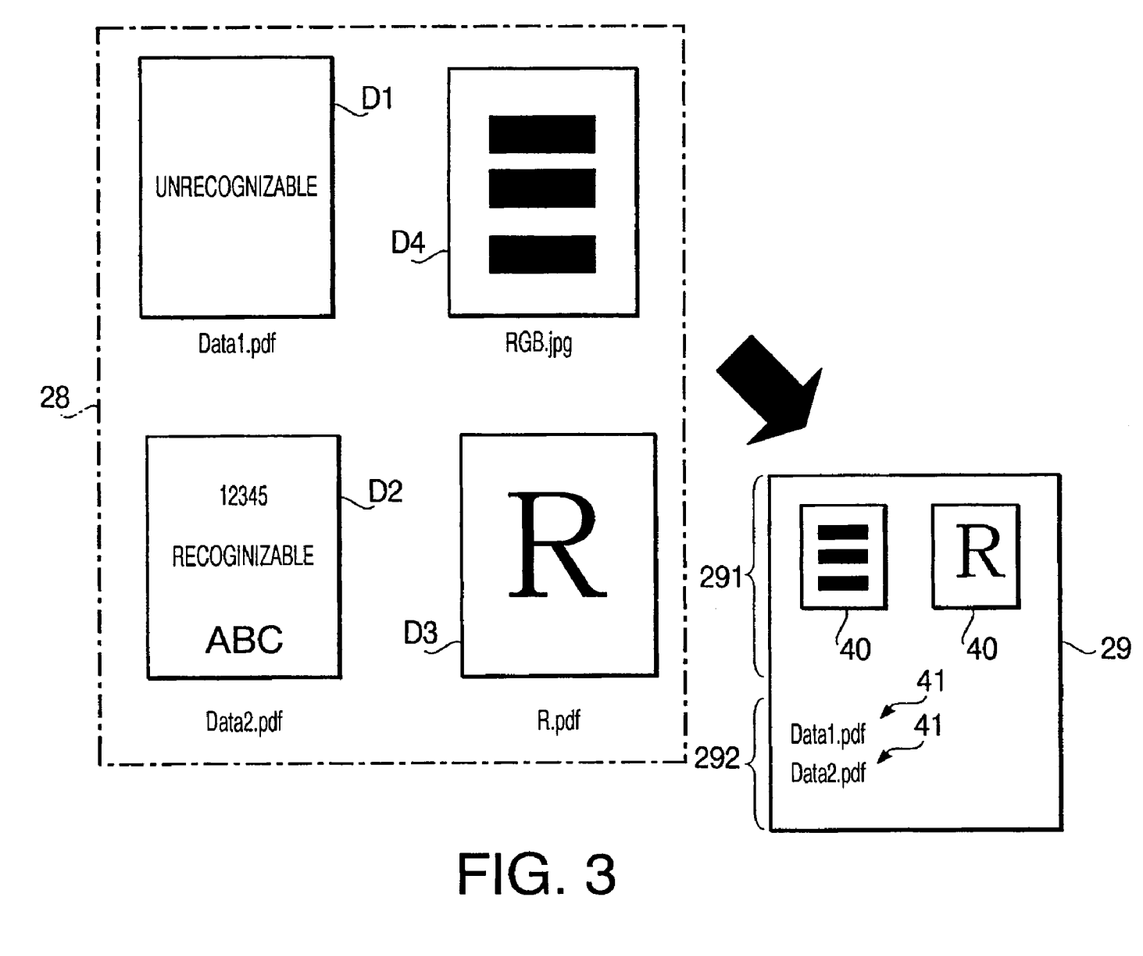
FIG. 3 is a schematic diagram showing an example of a set of data stored in a memory card and index images and/or character strings which are formed on a sheet by the image formation device based on the data set.

Next, the index image formed by the image formation device 1 will be explained referring to FIG. 3. FIG. 3 is a schematic diagram showing an example of a set of data stored in a memory card 28 and index images and/or character strings which are formed on a sheet 29 based on the data set.

As shown in FIG. 3, the memory card 28 has stored data D1, D2 and D3 ("Data1.pdf", "Data2.pdf", "R.pdf") including font data, and data D4 (RGB.jpg) not including font data.

The image formation device 1 of this embodiment selects data satisfying a prescribed condition from the data D1-D4 contained in the memory card 28 and executes the index image formation on the sheet 29 only for the selected data as shown in FIG. 3. Specifically, the image formation device 1 carries out the index image formation for a piece of data when the index image 40 (to be formed) corresponding to the data is judged to be recognizable to the user at the point of the index image formation. On the other hand, the index image formation is prohibited for the other data whose index images 40 are judged not to be recognizable to the user.

In the first embodiment, an index image 40 is judged to be recognizable to the user when the size of characters included in the index image 40 is judged to be larger than or equal to a prescribed size. Thus, each index image 40 whose character size is judged to be smaller than the prescribed size is judged to be unrecognizable to the user.

By the selection, only recognizable index images 40 (in which the size of the characters is larger than or equal to the prescribed size) are formed on the sheet 29, by which the inks and processing time of the image formation device 1 are prevented from being wasted on the formation of index images that are unrecognizable to the user. Consequently, index images 40 that are highly useful for visually checking the contents of the input data can be formed on the sheet 29, while also saving the inks and the processing time.

Incidentally, the data D1-D4 may either be page data (data in units of pages) created by use of software (document data creation software, spreadsheet software, graphic design software, etc.) or image data captured (generated) by a digital camera, scanner, etc. The following explanation will be given assuming that the image formation device 1 carries out the index image formation only for the first page when a piece of data (D1, D2, D3 or D4) includes two or more pages.

For each piece of data for which the formation of the corresponding index image 40 is prohibited, a data name 41 is formed (printed) on the sheet 29, which allows the user to visually recognize the contents of every piece of input data, even for the data for which no index image 40 is formed.

Incidentally, the "data name" means a name that has been assigned to each piece of input data for the identification/recognition of the data, which is also called "file name".

The sheet 29 includes a first area 291 in which the index images 40 are formed and a second area 292 in which the data names 41 are formed. In other words, the index images 40 and the data names 41 are formed separately from each other. By such arrangement in which thumbnails having similar shapes (index images 40, data names 41) are grouped together, the space on the sheet 29 can be used efficiently, by which a large number of index images 40 and/or data names 41 can be formed on the sheet 29 with high visibility.

Figure 4:
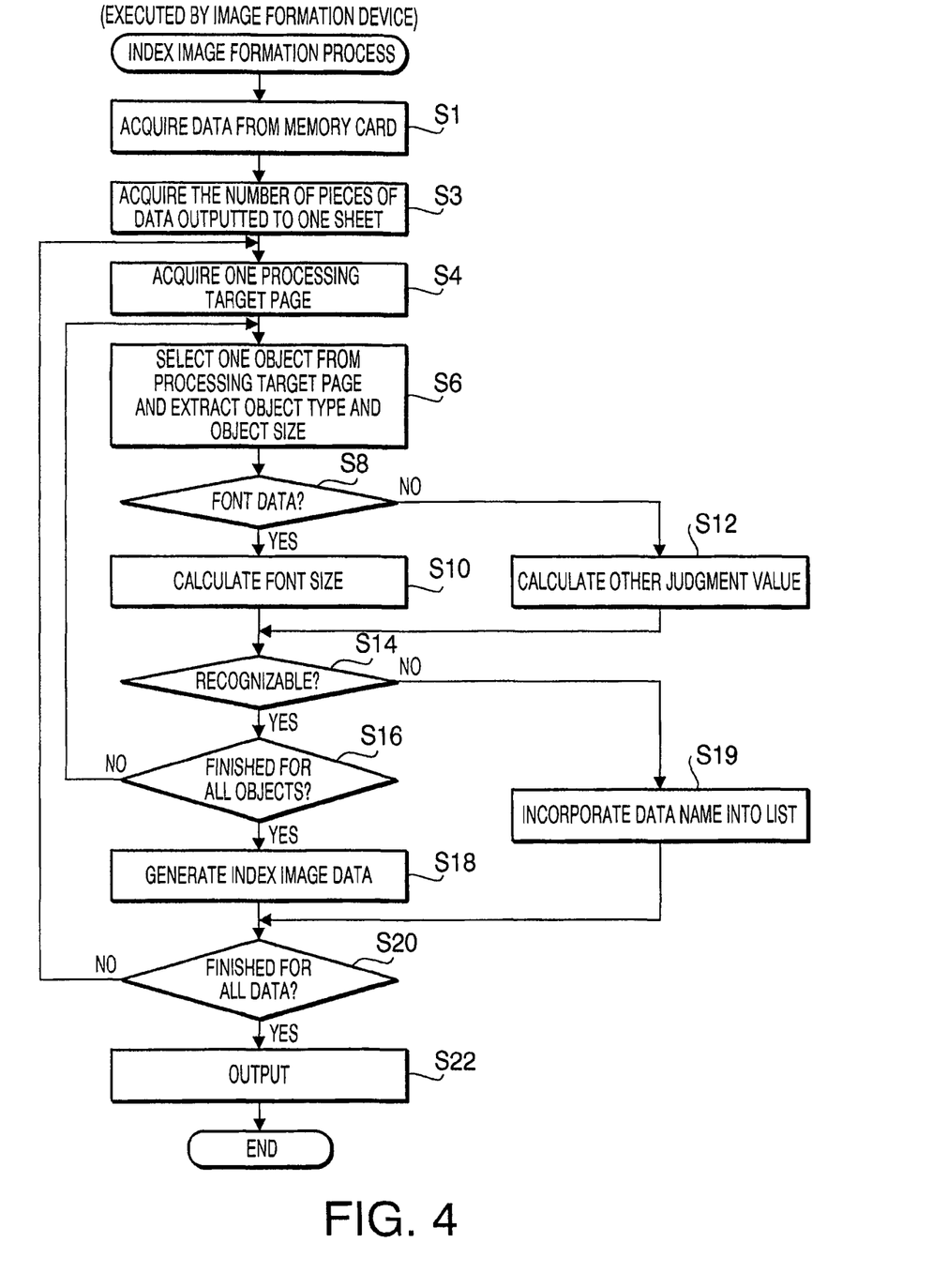
FIG. 4 is a flow chart showing an index image formation process which is executed by the image formation device of the first embodiment.

Next, the aforementioned index image formation process executed by the image formation device 1 of the first embodiment will be described referring to FIG. 4. FIG. 4 is a flow chart showing the index image formation process.

First, the image formation device 1 acquires data (see FIG. 3) from the memory card 28 (S1), while also acquiring the number of pieces of data that should be outputted to (printed on) one sheet (S3). The number (of pieces of data) acquired in S3 represents the number of index images that should be formed on one sheet. The number has been preset to the image formation device 1 by the user.

Subsequently, the image formation device 1 acquires the first page (first page data) of a piece of target data (data as a target of the index image formation), as a processing target page (S4). Incidentally, this explanation will be given assuming that the first page data acquired in S4 can include various types of objects, such as font data (including character string data), graphic objects (including drawing data) and image objects (including image data of images captured by a scanner, etc.). Subsequently, the image formation device 1 selects one object from the objects included in the processing target page and extracts the type and size of the selected object (S6).

Incidentally, the "object" means a data unit corresponding to a photo, a graphic, a figure, a group of characters, etc. which is included in the original (non-reduced) image corresponding to a piece of input data. Meanwhile, a photo, a graphic, a figure, a group of characters, etc. which is formed in the index image corresponding to an object will be called an "element".

The "font data" means any kind of data including text data (expressing characters, numbers, symbols, etc. by use of character codes). The font data may also include character attribute information (color, shape, etc.), format information, etc. In an expression "characters corresponding to the font data" which will be used below, the "characters" collectively mean characters, numbers, symbols, etc. that can be expressed by use of character codes.

Subsequently, the image formation device 1 judges whether the selected object is font data or not based on the extracted object type (S8). If the selected object is font data (S8: YES), the image formation device 1 calculates font size (an example of "judgment value") of the font data (S10).

The "font size" is a value to be used for judging the size of characters to be formed (in the index image) corresponding to the font data, that is, for judging whether the characters to be formed in the index image as an "element" corresponding to the font data is recognizable to the user or not. The font size is calculated based on original data of the index image and the size of the index image to be formed. Specifically, the "font size" is a value that is equivalent to a character size when the acquired font data is reduced by reduction ratio of the index image (calculated from the number of pieces of data that should be outputted to one sheet (acquired in S3) and the size of the processing target page).

Subsequently, the image formation device 1 judges whether the size of characters corresponding to the font data will become smaller than a prescribed size (e.g. 1 point) or not (that is, whether the characters in the index image will be recognizable to the user or not) by comparing the font size calculated in S10 with the prescribed size (S14). If the judgment of S14 is affirmative (S14: YES), the image formation device 1 judges whether it has processed all the objects in the processing target page or not (S16). If affirmative (S16: YES), the image formation device 1 returns to the step S6 to repeat the steps S6-S14 for the next object.

If the selected object is not font data in S8 (S8: NO), the image formation device 1 calculates a judgment value to be used for judging whether an element (photo, graphic, figure, etc.) that is formed in the index image corresponding to the selected object is recognizable to the user or not (S12).

Subsequently, the image formation device 1 judges whether the element corresponding to the selected object is recognizable or not by comparing the judgment value calculated in S12 with a prescribed value (S14). The judgment value is a value calculated based on the input data and the size of the index image to be formed. For example, in cases where the element corresponding to the object is formed according to the reduction ratio of the index image, occupancy ratio (area ratio) of black dots in the element (reduced photo, graphic, figure, etc.) can be used as the judgment value. Specifically, the element (reduced photo, graphic, figure, etc. in the index image) may be judged to have become obscure and unrecognizable due to the reduction if the occupancy ratio (area ratio) of black dots in the input data before the reduction is less than 80% but the occupancy ratio of black dots in the element (reduced photo, graphic, figure, etc.) exceeds 80%, for example.

When the judgment of S14 (repeatedly executed for the objects) is finished for all the objects without resulting in "NO" even once (S16: YES), the index image of the data can be regarded to be recognizable, and thus the image formation device 1 generates index image data (to be used for the formation the index image of the processing target page) by reducing the processing target page (S18). Subsequently, the image formation device 1 judges whether the above processing has been finished for all the data acquired in S1 (S20).

If negative in S20 (S20: NO), the image formation device 1 returns to the step S4 to acquire the first page (first page data) of the next data and to repeat the subsequent steps for the next data. When the judgment of S14 results in "NO" (S14: NO) at least once during the repetition of S14, the image formation device 1 incorporates the data name of the processing target data (currently processed data) into a data name list (S19) without generating the index image data for the processing target data, and then advances to the step S20.

When the judgment of S20 turns affirmative (S20: YES) during the repetition of the processing, the index image data which have been generated and the data names which have been incorporated into the data name list are outputted (supplied) to the printer 21 as print data via the I/O port 27 (see FIG. 2) (S22).

As above, in the index image formation process of FIG. 4, the index image is formed only for data whose index image is judged to be recognizable, while no index image is formed (i.e. the formation (printing) of the index image is prohibited) for data whose index image is judged to be unrecognizable.

Further, once the judgment of S14 results in "NO" during the repetition of S6-S16, the index image of the judgment target data is judged to be unrecognizable and the repetition of the judgment (S14) regarding the judgment target data is ended. Thus, the judgment on whether each index image (corresponding to each piece of input data) is recognizable or not can be made more quickly compared to cases where the calculation of the judgment value such as the font size (S10, S12) and the judgment (S14) are repeated for all the objects included in each piece of input data.

Furthermore, in cases where the selected object is font data, the judgment on whether the index image is recognizable or not can be made by a simple process of calculating the font size and comparing the font size with the prescribed size, by which the processing time of the image formation device 1 can be saved.

Embodiment 2

In the following, a second embodiment in accordance with the present invention, regarding the control of the image formation device 1, will be described referring to FIGS. 5 and 6. The external appearance and the block diagram of the image formation device 1 in the second embodiment are identical with those in the first embodiment, and thus repeated illustration and explanation thereof are omitted. Components identical or equivalent to those in the first embodiment are assigned the same or similar reference characters as those in the first embodiment and repeated explanation thereof is omitted for brevity.

Figure 5:
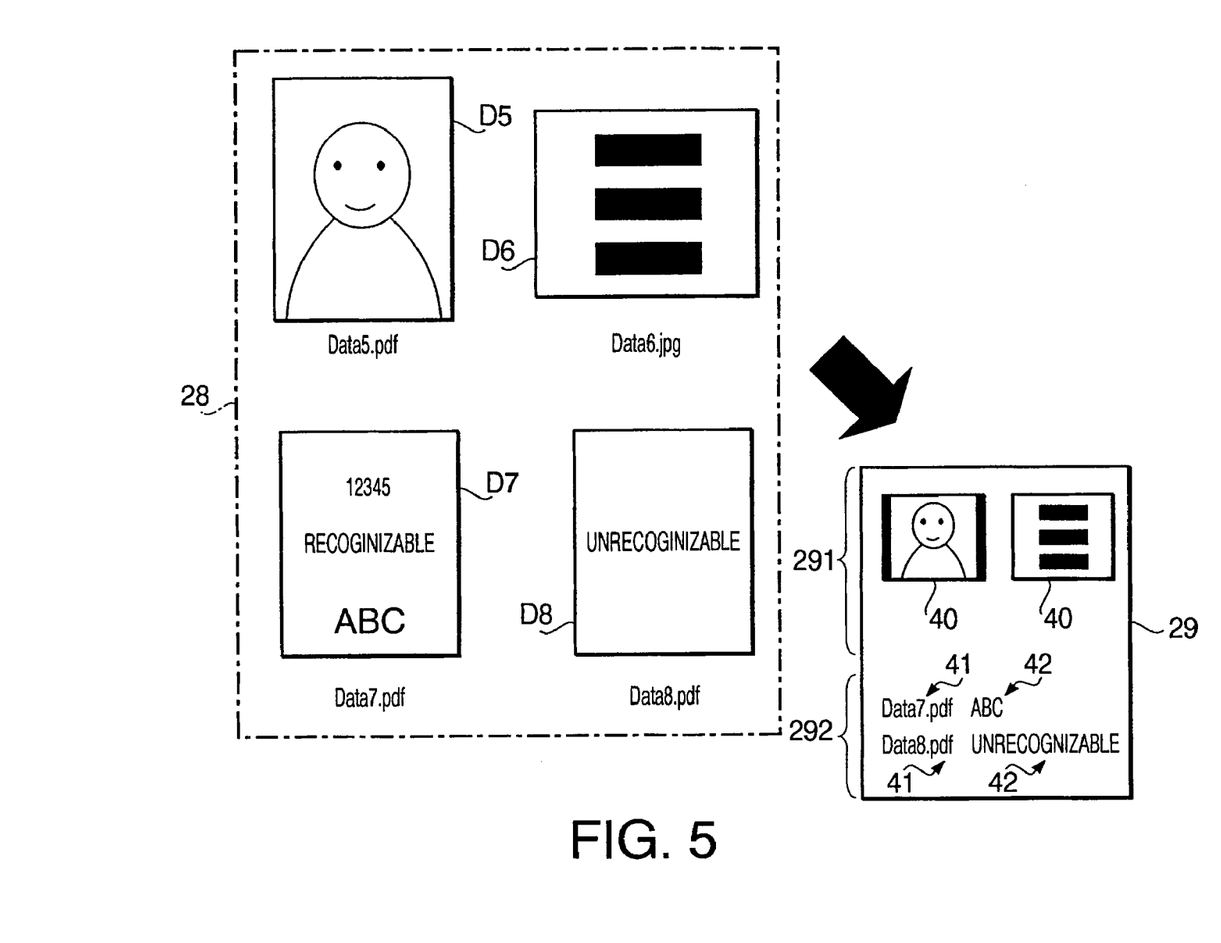
FIG. 5 is a schematic diagram (corresponding to FIG. 3 about the first embodiment) for explaining index images and character strings which are formed on a sheet by an index image formation process in accordance with a second embodiment of the present invention.

FIG. 5 is a schematic diagram (corresponding to FIG. 3 about the first embodiment) for explaining index images and character strings which are formed on a sheet by an index image formation process (see FIG. 6) in accordance with the second embodiment.

In the first embodiment which has been explained referring to FIG. 3, the direction of each index image was not taken into consideration in the calculation of the judgment value (font size, etc.). In this second embodiment, the judgment value (font size, etc.) is obtained taking the direction of the index image into account. For example, there are cases where all the index images are formed uniformly in the landscape format when data in the portrait format (data of photos, etc. in the portrait orientation) and data in the landscape format (data of photos, etc. in the landscape orientation) coexist in the memory card 28 as shown in FIG. 5. In such cases, in order to fit the whole image of the data D5 (in the portrait format) in an index image 40 (in the landscape format), the data D5 has to be reduced by use of a smaller scaling factor (larger reduction ratio) compared to the data D6 which involves no change of orientation.

Therefore, the index image formation process in the second embodiment (FIG. 6) is designed to calculate the judgment value (font size, etc.) by use of a reduction ratio which is determined taking the orientation of the original data and the orientation of the index image into account, by which the judgment on whether each index image 40 is recognizable or not can be made more properly and correctly.

Further, the index image formation process in the second embodiment (FIG. 6) does not form the index image for data including font data as shown in FIG. 5, differently from the first embodiment in which the judgment on the recognizability of the index image is made even for data including font data and the index image (of data including font data) can be judged to be recognizable and thereby formed (see FIG. 3) when the font size of every piece of font data (as the aforementioned "selected object") is the prescribed size or larger.

Furthermore, while only the data name is formed on the sheet 29 for each piece of "unrecognizable data" (data whose index image is judged to be unrecognizable) in the first embodiment, the index image formation process in the second embodiment extracts font data of a forefront character string from data including font data (in addition to the extraction of the data name 41) and forms a character string 42 according to the extracted font data on the sheet 29 while associating the character string 42 with the data name 41 as shown in FIG. 5. The character string 42 added to the data name 41 helps the user to recognize the contents of the data when no index image is formed for the data.

Incidentally, the character string added to the data name 41 is not restricted to the forefront character string; a character string of the largest size, a character string of the highest appearance ratio, etc. can also be used.

Figure 6:
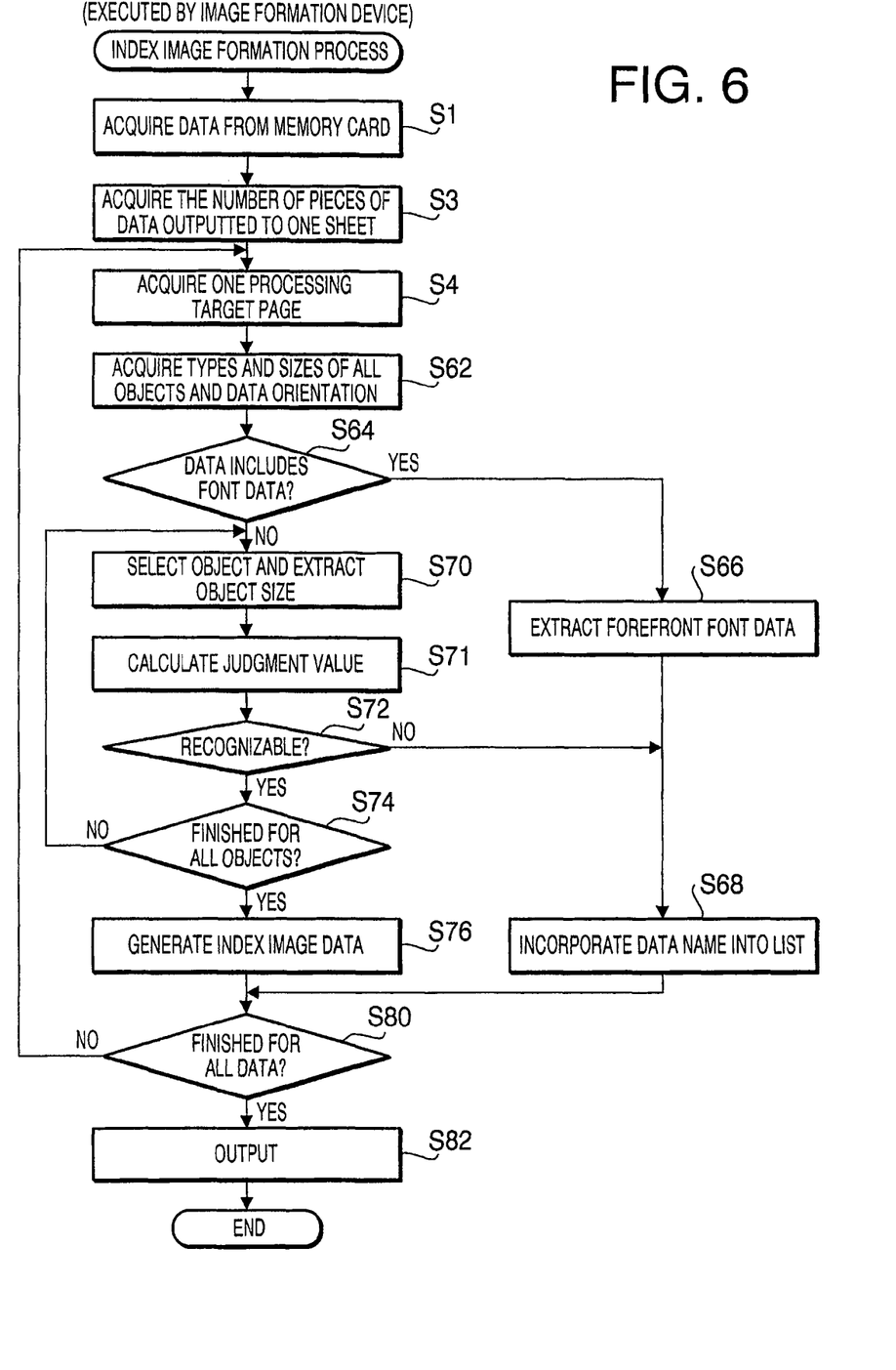
FIG. 6 is a flow chart showing the index image formation process in accordance with the second embodiment.

FIG. 6 is a flow chart showing the index image formation process in accordance with the second embodiment, wherein steps identical with those in the index image formation process of the first embodiment (FIG. 4) are assigned the same step numbers and detailed explanation thereof is omitted for brevity. The following explanation will be given assuming that whether the index images should be unified into the portrait format or into the landscape format has previously been determined and set to the image formation device 1 by the user.

First, the image formation device 1 acquires data (see FIG. 5) from the memory card 28 (S1), acquires the number of pieces of data that should be outputted to (printed on) one sheet (S3), and acquires the processing target page (S4) similarly to the first embodiment. Subsequently, the image formation device 1 acquires the types and sizes of all the objects included in the processing target page and the orientation of the processing target page (S62).

Subsequently, the image formation device 1 judges whether the processing target page includes font data or not based on the acquired object types (S64). If the processing target page includes font data (S64: YES), the image formation device 1 extracts the forefront font data from the processing target page (S66) and incorporates the data name of the processing target data into a data name list (S68).

On the other hand, if the processing target page includes no font data (S64: NO), the image formation device 1 selects one object from the objects included in the processing target page and extracts the size of the selected object (S70). Subsequently, the image formation device 1 calculates a judgment value to be used for judging whether an element (figure, image, etc.) that is formed in the index image corresponding to the selected object is recognizable to the user or not (S17), and makes the judgment (whether the element corresponding to the selected object is recognizable or not) by comparing the judgment value with a prescribed value (S72).

Incidentally, while the index image formation process of the second embodiment (FIG. 6) calculates the judgment value based on the sizes of the processing target page and the index image similarly to the index image formation process of the first embodiment (FIG. 4), the process of FIG. 6 changes the reduction ratio (used for the calculation of the judgment value) depending on whether the orientation of the original data coincides with that of the index image or not differently from the process of FIG. 4.

When the judgment of S72 (repeatedly executed for the objects) is finished for all the objects without resulting in "NO" even once (S74: YES), the index image of the data can be regarded to be recognizable, and thus the image formation device 1 generates index image data (to be used for the formation the index image of the processing target page) by reducing the processing target page (S76). Subsequently, the image formation device 1 judges whether the above processing has been finished for all the data acquired in S1 (S80).

If negative in S80 (S80: NO), the image formation device 1 returns to the step S4 to repeat the subsequent steps for the next data. When the judgment of S72 results in "NO" (S72: NO) at least once during the repetition of S72, the image formation device 1 incorporates the data name of the processing target data (currently processed data) into the data name list (S68) and then advances to the step S80.

When the judgment of S80 turns affirmative (S80: YES) during the repetition of the processing, the index image data which have been generated and the data names which have been incorporated into the data name list (and the forefront font data when extracted in S66) are outputted (supplied) to the printer 21 as print data via the I/O port 27 (see FIG. 2) (S82).

As above, in the index image formation process of the second embodiment (FIG. 6), the index images are formed on the sheet 29 (see FIG. 5) only for data that are judged to include no font data. For data that are judged to include font data and for the "unrecognizable data" (i.e. data whose index image is judged to be unrecognizable), the data names are formed on the sheet 29 without forming the index images. Further, for each piece of data that is judged to include font data, the forefront character string is formed on the sheet 29 in addition to the data name.

The index image formation process of the second embodiment (FIG. 6) achieves effects similar to those of the index image formation process of the first embodiment (FIG. 4). Further, higher processing speed can be realized since the calculation of the judgment value, the judgment on the recognizability (repeated for the selected objects), the generation of the index image data, etc. are omitted for each piece of input data that includes font data.

The forefront character string corresponding to the forefront font data (or the character string of the largest size, highest appearance ratio, etc.), which is formed in addition to the data name, is highly likely to be a character string properly representing the contents of the input data (title, keyword, etc.), which allows the user to recognize the contents of the input data with ease even when no index image is formed for the input data.

The reduction ratio (used for the calculation of the judgment value (e.g. font size)) is determined taking the orientation of the original input data and the orientation of the index image into account, by which the judgment on whether each index image is recognizable or not is made more properly and correctly.

Embodiment 3

Figure 7:
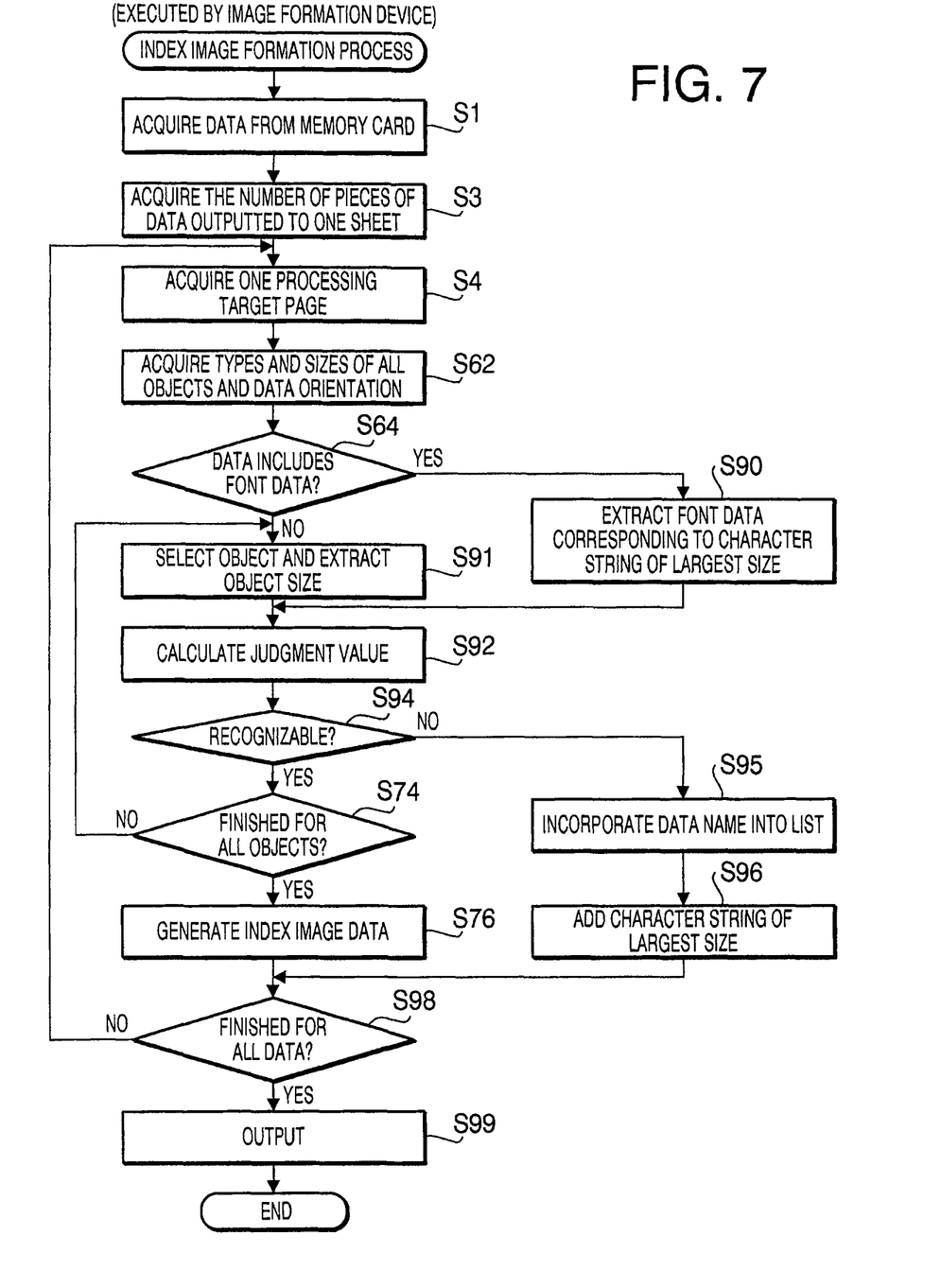
FIG. 7 is a flow chart showing an index image formation process in accordance with a third embodiment of the present invention.

In the following, a third embodiment in accordance with the present invention, regarding the control of the image formation device 1, will be described referring to FIG. 7. FIG. 7 is a flow chart showing an index image formation process in accordance with the third embodiment, wherein steps identical with those in the index image formation process of the second embodiment (FIG. 6) are assigned the same step numbers and detailed explanation thereof is omitted for brevity. The external appearance and the block diagram of the image formation device 1 in the third embodiment are identical with those in the first embodiment, and thus repeated illustration and explanation thereof are omitted.

In the index image formation process of the third embodiment (FIG. 7), the image formation device 1 judges whether the processing target page includes font data or not (S64). If the processing target page includes font data (S64: YES), the image formation device 1 extracts font data corresponding to a character string of the largest size from the processing target page (S90) and thereafter advances to step S92.

If the processing target page includes no font data (S64: NO), the image formation device 1 selects one object from the processing target page, extracts the size of the selected object (S91), and thereafter advances to step S92. Incidentally, the object selected in S91 is of a type other than font data.

In the step S92, the image formation device 1 calculates a judgment value to be used for judging whether an element (figure, image, etc.) that is formed in the index image corresponding to the object selected in S91, or an element (character string) that is formed in the index image corresponding to the font data extracted in S90, is recognizable to the user or not (S92).

Subsequently, the image formation device 1 judges whether the element corresponding to the selected/extracted object is recognizable or not by comparing the judgment value with a prescribed value (S94). Incidentally, the "prescribed value" used for the judgment on whether a character string is recognizable or not and the "prescribed value" used for the judgment on whether a figure, image, etc. is recognizable or not are prestored values which are different from each other.

If the judgment of S94 is negative (S94: NO), that is, when the character string of the largest size (corresponding to the font data extracted in S90) or the figure, image, etc. (corresponding to the object (other than font data) selected in S91) becomes unrecognizable to the user when reduced for the index image, the image formation device 1 incorporates the data name of the processing target data (currently processed data) into the data name list (S95), adds the character string of the largest size (corresponding to the extracted font data) to the data name when the font data has been extracted in S90 (S96), and thereafter advances to step S98.

When the judgment of S94 is finished for all the objects selected in S91 (or for the object (font data) extracted in S90) without resulting in "NO" even once (S74: YES), the index image of the data can be regarded to be recognizable, and thus the image formation device 1 generates index image data (to be used for the formation the index image of the processing target page) by reducing the processing target page (S76). Thereafter, the process advances to the step S98.

In the step S98, the image formation device 1 judges whether the above processing has been finished for all the data acquired in S1. If negative (S98: NO), the image formation device 1 returns to the step S4 to repeat the processing for the next data.

As above, for data including font data, the repetition of the steps S91, S92 and S94 (the selection of an object, the calculation of the judgment value and the comparison of the judgment value with the prescribed value) for all the objects is not carried out and only the judgment on whether the character string of the largest size will become recognizable to the user (when reduced for the index image) or not is made in S94, by which high processing speed can be realized. When the character string of the largest size is judged to become recognizable to the user (S94: YES), the index image is formed for the data, otherwise (S94: NO) the data name and the character string of the largest size are formed for the data without forming the index image.

When the judgment of S98 turns affirmative (S98: YES) during the repetition of the processing, the index image data which have been generated and the data names which have been incorporated into the data name list (and the character strings of the largest sizes when added in S96) are outputted (supplied) to the printer 21 as print data via the I/O port 27 (see FIG. 2) (S99).

As above, in the index image formation process of the third embodiment (FIG. 7), for each piece of data including no font data, the index image is formed only when all the elements (figures, images, etc.) corresponding to all the objects included in the data are judged to be recognizable in the index image. When there exists an element that is judged to be unrecognizable, the data name of the data is formed instead of forming the index image. For each piece of data including font data, the index image is formed only when the character string of the largest size is judged to become recognizable to the user when reduced for the index image. When the character string of the largest size is judged to become unrecognizable, the data name and the character string of the largest size are formed instead of forming the index image.

The index image formation process of the third embodiment (FIG. 7) achieves high processing speed similarly to the process of second embodiment (FIG. 6), since the repetition of the object selection, judgment value calculation and judgment (S91, S92, S94) for all the objects is omitted and only the judgment on the recognizability of the largest-size character string in the index image is made (S94) for data including font data.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while the image formation device 1 has been described in the above embodiments as a so-called MFP (Multi-Function Peripheral) having the copy function, the facsimile transmission/reception function, etc. integrated in one body, the present invention is applicable to any type of device capable of forming (printing, displaying) index images corresponding to input data on a print medium or a display device.

While the index images are formed using data stored in a memory card as input data in the above embodiments, the present invention is also applicable to the so-called "N in 1 printing" (in which data for multiple pages are printed on one sheet according to print data inputted from the PC 31, for example). The present invention is also applicable to cases where index images of documents scanned by the scanner 20 are formed (printed, displayed) on a sheet 29 or the LCD 16 (examples of the "output medium") before facsimile transmission.

While the index image formation processes of the above embodiments (FIGS. 4, 6 and 7) have been assumed to be executed by the image formation device 1, the processes may also be executed by the PC 31. In other words, the PC 31 may be configured to analyze each piece of data (to judge whether the index image should be formed for the data), generate the index image data for data for which the index images should be formed while extracting data names or font data from data for which the index images should not be formed, and output the index image data, the data names and/or font data to the image formation device 1 as print data. In this case, the image formation device 1 functions as an output unit of the PC 31 (computer).

While the index image 40 is assumed to be formed only for the first page of each piece of data in the above embodiments, it is also possible to form index images for all pages included in each piece of data. In this case, all the pages (for which the formation of the index image is possible) are handled as the judgment target pages (processing target pages) for which the judgment on whether the index image is recognizable or not is made.

While the index image data in the above embodiments is formed by reducing the size of data that is judged to become recognizable when reduced, the index image formation process may also be configured to judge whether the index image data is already contained in the data (that is judged to become recognizable) or not and acquire the index image data from the data when already contained in the data (while generating the index image data only when the data contains no index image data). With this configuration, the process for newly generating the index image data becomes unnecessary for data already containing the index image data, by which the processing time can be saved.

While the index image data in the above embodiments is generated by reducing the size of data whose index image is judged to be recognizable, the index image formation process may also be configured to acquire index image data corresponding to the data (whose index image is judged to be recognizable) from the memory card and print out the acquired index image data in cases where the index image data corresponding to the data has previously been stored in the memory card (as a separate file, for example) together with the data. With this configuration, the process for newly generating the index image data becomes unnecessary for data for which the index image data have already been stored in the memory card, by which the processing time can be saved.

In cases where data already having the corresponding index image data in the memory card and data having no corresponding index image data in the memory card coexist in the memory card, the index image formation process may judge whether there exists index image data corresponding to the data (whose index image is judged to be recognizable) in the memory card or not and print out the corresponding index image data acquired from the memory card when the index image data exists in the memory card (while printing out index image data newly generated from the data when no corresponding index image data exists in the memory card).

Figure 8:
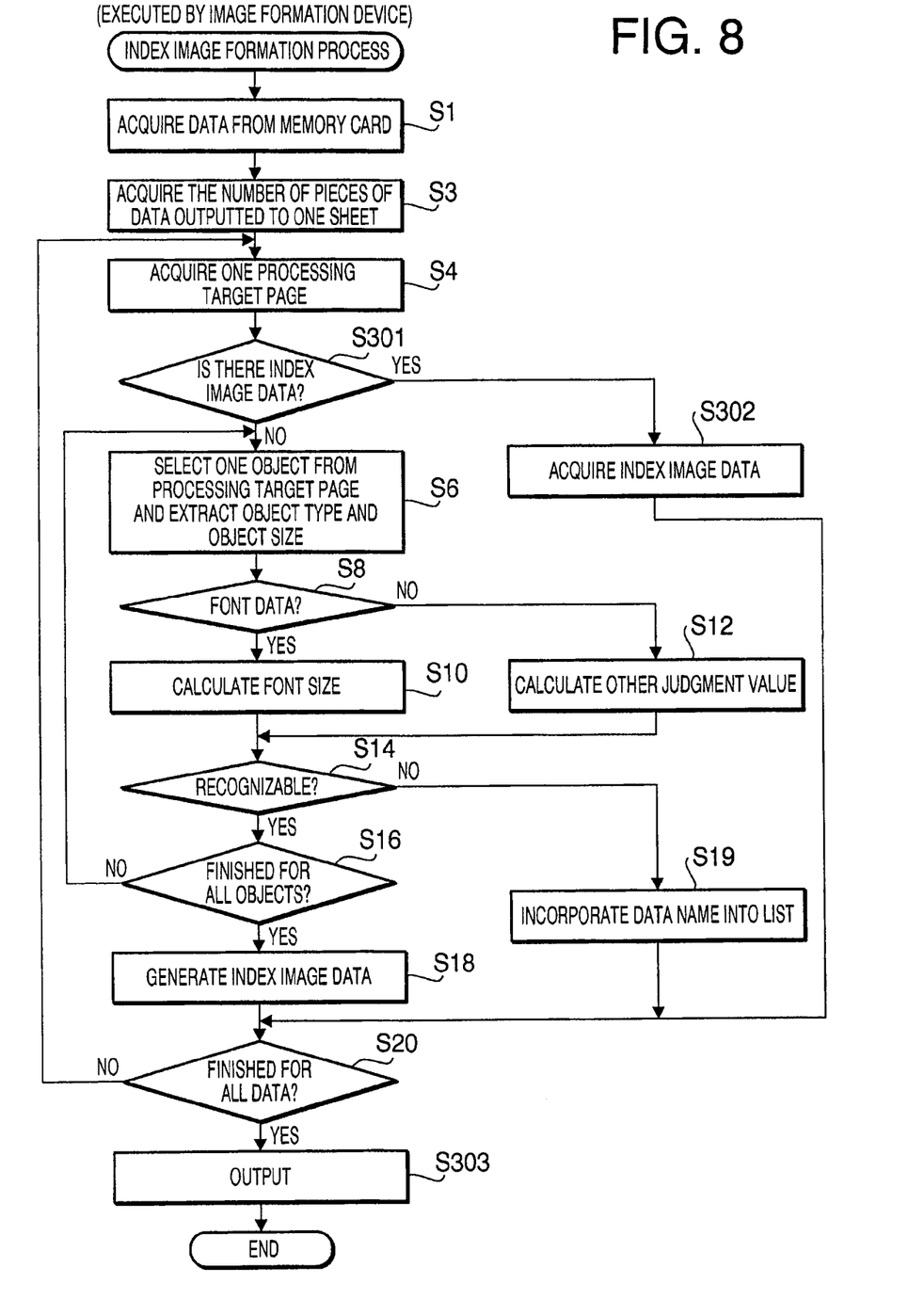
FIG. 8 is a flow chart showing a modification of the index image formation process.

FIG. 8 is a flow chart showing a modification of the index image formation process, wherein steps identical with those in the index image formation process of the first embodiment (FIG. 4) are assigned the same step numbers and repeated explanation thereof is omitted for brevity.

In the modification shown in FIG. 8, whether or not index image data corresponding to the acquired processing target page already exists in the processing target page (page data) itself or in the memory card is judged (S301). When the corresponding index image data already exists (S301: YES), the corresponding index image data is acquired from the processing target page (page data) or the memory card (S302) and outputted (e.g. supplied to the printer 21 via the I/O port 27) (S303), by which the image formation device is allowed to form an index image corresponding to the processing target page based on the corresponding index image data already existing in the processing target page (page data) or the memory card.

On the other hand, when no corresponding index image data exists in the processing target page or the memory card, that is, when it is impossible to acquire corresponding index image data (S301: NO), whether a reduced image corresponding to the processing target page is recognizable or not is judged in S6-S16. The index image data is generated (S18) only for data whose reduced image is judged to be recognizable, and the generated index image data is outputted (e.g. supplied to the printer 21 via the I/O port 27) (S303), by which only reduced images that are judged to be recognizable are formed, while prohibiting the formation of reduced images that are judged to be unrecognizable.

In the above modification (FIG. 8), whether index image data corresponding to each piece of data as a target of the index printing exists in the memory card or not is judged. When the corresponding index image data exists in the memory card, the index printing is carried out unconditionally for the data by use of the corresponding index image data in the memory card, without making the judgment on whether the index image is recognizable to the user or not, by which the processing time necessary for the judgment on the recognizability can be reduced.

While the first embodiment has been described assuming that the font size and the judgment value are calculated without taking the orientation (portrait, landscape) of the data into consideration, the index image formation process of the first embodiment (FIG. 4) may also be designed to calculate the font size or the judgment value taking the data orientation into account similarly to the second and third embodiments. The index image formation process (FIG. 4) may also be configured to change the prescribed value to be compared with the font size and/or the prescribed value to be compared with the judgment value depending on the data orientation.

While only the data name is formed for "unrecognizable data" (i.e. data whose index image is judged to be unrecognizable) in the first embodiment, the index image formation process of the first embodiment (FIG. 4) may also be configured to extract font data from the "unrecognizable data" and form (print) the extracted font data on the sheet 29 in addition to or in place of the data name similarly to the second and third embodiments.

While the second and third embodiments have been described assuming that the reduction ratio used for the calculation of the judgment value is changed depending on the orientation of the data and the orientation of the index image, it is also possible to change the prescribed value (to be compared with the judgment value) instead, depending on the data orientation and the index image orientation.

While the index printing (the printing of the index images, etc. on the sheet 29) in the above embodiments is executed separately for the two areas: the area for the index image data obtained by reducing "recognizable data" (data whose index images are judged to be recognizable) and the area for the data names (e.g. file names), etc. of the "unrecognizable data" (data whose index images are judged to be unrecognizable), the index printing may be carried out differently. For example, the index images of the "recognizable data" and the data names, etc. of the "unrecognizable data" may be printed successively in a common area, simply in the order of data acquisition (irrespective of whether each piece of data is "recognizable" or "unrecognizable"). It is also possible to change the print layout depending on the ratio of the "unrecognizable data" to all the acquired data. For example, the index printing may be carried out in the separated layout (i.e. separately for the area for the index images and the area for the data names, etc.) when the ratio of the "unrecognizable data" is 50% or more and in the simple layout (in a common area according to the order of data acquisition) when the ratio is less than 50%.

While each of the above embodiments/modifications has been described with a limited number of specific features for convenience of explanation, a specific feature of an embodiment/modification may of course be incorporated in some of the other embodiments/modifications in a similar manner when possible.

What is claimed is:

1. An image formation device capable of forming a plurality of reduced images on an output medium, comprising:
   an input data acquisition unit which acquires input data;
   a recognizability judgment unit which judges whether each reduced image to be formed corresponding to each piece of input data acquired by the input data acquisition unit is recognizable to a user or not based on the input data and size of the reduced image to be formed; and
   a reduced image formation unit which forms the reduced images that are judged to be recognizable by the recognizability judgment unit on the output medium while prohibiting the formation of the reduced images that are judged to be unrecognizable by the recognizability judgment unit,
   wherein the reduced image formation unit includes:
   a reduced image data acquisition unit which acquires reduced image data, to be used for forming the reduced image that is judged to be recognizable by the recognizability judgment unit, from the input data corresponding to the reduced image when the reduced image data is included in the input data; and
   a reduced image data generation unit which generates the reduced image data, to be used for forming the reduced image that is judged to be recognizable by the recognizability judgment unit, based on the input data corresponding to the reduced image when the reduced image data is not included in the input data,
   wherein the reduced image formation unit forms the reduced image of each piece of input data on the output medium according to the reduced image data acquired by the reduced image data acquisition unit or generated by the reduced image data generation unit.

2. The image formation device according to claim 1,
   wherein the reduced image formation unit includes a reduced image data generation unit which generates reduced image data, to be used for forming the reduced image that is judged to be recognizability judgment unit, based on the input data corresponding to the reduced image, and wherein the reduced image formation unit forms the reduced images on the output medium according to the reduced image data generated by the reduced image data generation unit.

3. The image formation device according to claim 1, wherein the reduced image formation unit forms a data name of the input data whose reduced image is judged to be unrecognizable by the recognizability judgment unit on the output medium.

4. The image formation device according to claim 3, wherein the reduced image formation unit forms the reduced images that are judged to be recognizable by the recognizability judgment unit in a first area of the output medium, while forming data names of the input data whose reduced images are judged to be unrecognizable by the recognizability judgment unit in a second area of the output medium.

5. An image formation device capable of forming a plurality of reduced images on an output medium, comprising:
   an input data acquisition unit which acquires input data;
   a recognizability judgment unit which judges whether each reduced image to be formed corresponding to each piece of input data acquired by the input data acquisition unit is recognizable to a user or not based on the input data and size of the reduced image to be formed; and
   a reduced image formation unit which forms the reduced images that are judged to be recognizable by the recognizability judgment unit on the output medium while prohibiting the formation of the reduced images that are judged to be unrecognizable by the recognizability judgment unit,
   wherein each piece of input data includes one or more objects,
   wherein the reduced image corresponding to each piece of input data is made up of elements which are formed corresponding to the objects, respectively,
   wherein the recognizability judgment unit includes:
      a selection unit which selects an object from the objects included in the input data as a judgment target;
      a calculation unit which calculates a judgment value to be used for judging whether the element formed in the reduced image corresponding to the object selected by the selection unit is recognizable to the user or not;
      a comparison unit which judges whether the element corresponding to the selected object is recognizable or not by comparing the judgment value calculated by the calculation unit with a prescribed value; and
      a repetition control unit which makes the selection unit, the calculation unit and the comparison unit to repeat the selection of an object, the calculation of the judgment value and the comparison for the next object when the element currently processed is judged to be recognizable by the comparison unit, and
   wherein the recognizability judgment unit judges that the reduced image of the input data as the judgment target is unrecognizable and ends the judgment regarding the input data when an element of the reduced image is judged to be unrecognizable during the repetition controlled by the repetition control unit.

6. The image formation device according to claim 5, wherein when the object selected by the selection unit is font data, the calculation unit calculates size of characters corresponding to the font data, after being reduced by reduction ratio of the reduced image, as the judgment value.

7. The image formation device according to claim 5, wherein the calculation unit calculates the judgment value taking orientation of the reduced image and orientation of the input data into account.

8. The image formation device according to claim 5, wherein the recognizability judgment unit includes:
   a largest font data extraction unit which extracts a piece of font data having the largest character size from all font data included in the input data; and
   a largest font data judgment unit which judges whether a character string formed in the reduced image corresponding to the font data extracted by the largest font data extraction unit is recognizable to the user or not,
   wherein the recognizability judgment unit judges that the reduced image corresponding to the input data is unrecognizable to the user when the character string formed in the reduced image is judged to be unrecognizable by the largest font data judgment unit.

9. The image formation device according to claim 8, wherein the reduced image formation unit extracts font data, forming part of the input data whose reduced image is judged to be unrecognizable by the recognizability judgment unit, from the input data and forms a character string according to the font data on the output medium.

10. The image formation device according to claim 5,
   wherein the reduced image formation unit includes a reduced image data generation unit which generates reduced image data, to be used for forming the reduced image that is judged to be recognizable by the recognizability judgment unit, based on the input data corresponding to the reduced image, and
   wherein the reduced image formation unit forms the reduced images on the output medium according to the reduced image data generated by the reduced image data generation unit.

11. The image formation device according to claim 5, wherein the reduced image formation unit forms a data name of the input data whose reduced image is judged to be unrecognizable by the recognizability judgment unit on the output medium.

12. The image formation device according to claim 11, wherein the reduced image formation unit forms the reduced images that are judged to be recognizable by the recognizability judgment unit in a first area of the output medium, while forming data names of the input data whose reduced images are judged to be unrecognizable by the recognizability judgment unit in a second area of the output medium.

13. An image formation device capable of acquiring multiple pieces of input data and forming a plurality of reduced images corresponding to the multiple pieces of input data on an output medium, comprising:
   an acquisition judgment unit which judges whether reduced image data necessary for the formation of each reduced image corresponding to each of the multiple pieces of input data is acquirable or not;
   a reduced image acquisition unit which acquires the reduced image data when the reduced image data is judged to be acquirable by the acquisition judgment unit;
   an image formation unit which forms the reduced image on the output medium according to the reduced image data when the reduced image data is acquired by the reduced image acquisition unit; and
   a recognizability judgment unit which judges whether each reduced image to be formed corresponding to each of the multiple pieces of input data is recognizable to a user or not based on the input data and size of the reduced image to be formed, when the reduced image data necessary for the formation of the reduced image is judged not to be acquirable by the acquisition judgment unit, wherein the image formation unit includes a reduced image formation unit which forms the reduced images that are judged to be recognizable by the recognizability judgment unit on the output medium while prohibiting the formation of the reduced images that are judged to be unrecognizable by the recognizability judgment unit.

14. A non-transitory computer-readable recording medium storing computer-readable instructions that cause a computer to function as:

an input data acquisition unit which acquires input data;

an acquisition judgment unit which judges whether reduced image data necessary for formation of each reduced image corresponding to each piece of input data is acquirable or not;

a reduced image acquisition unit which acquires the reduced image data when the reduced image data is judged to be acquirable by the acquisition judgment unit;

a control unit which makes an output unit form the reduced image according to the reduced image data when the reduced image data is acquired by the reduced image acquisition unit; and a recognizability judgment unit which judges whether each reduced image to be formed corresponding to each piece of input data is recognizable to a user or not based on the input data and size of the reduced image to be formed, when the reduced image data necessary for the formation of the reduced image is judged not to be acquirable by the acquisition judgment unit, wherein the control unit makes the output unit form the reduced images that are judged to be recognizable by the recognizability judgment unit while prohibiting the formation of the reduced images that are judged to be unrecognizable by the recognizability judgment unit.

15. An image formation device capable of forming a plurality of reduced images on an output medium, comprising:

an input data acquisition unit which acquires input data;

a recognizability judgment unit which judges whether each reduced image to be formed corresponding to each piece of input data acquired by the input data acquisition unit is recognizable to a user or not based on the input data and size of the reduced image to be formed; and a reduced image formation unit which forms the reduced images that are judged to be recognizable by the recognizability judgment unit on the output medium while prohibiting the formation of the reduced images that are judged to be unrecognizable by the recognizability judgment unit, wherein the reduced image formation unit forms a data name of the input data whose reduced image is judged to be unrecognizable by the recognizability judgment unit on the output medium.

16. The image formation device according to claim 15, wherein the reduced image formation unit forms the reduced images that are judged to be recognizable by the recognizability judgment unit in a first area of the output medium, while forming data names of the input data whose reduced images are judged to be unrecognizable by the recognizability judgment unit in a second area of the output medium.

17. A non-transitory computer-readable recording medium storing computer-readable instructions that cause a computer to function as:

an input data acquisition unit which acquires input data;

a recognizability judgment unit which judges whether each reduced image to be formed corresponding to each piece of input data acquired by the input data acquisition unit is recognizable to a user or not based on the input data and size of the reduced image to be formed; and a reduced image formation unit which forms the reduced images that are judged to be recognizable by the recognizability judgment unit on the output medium while prohibiting the formation of the reduced images that are judged to be unrecognizable by the recognizability judgment unit, wherein the reduced image formation unit includes:

a reduced image data acquisition unit which acquires reduced image data, to be used for forming the reduced image that is judged to be recognizable by the recognizability judgment unit, from the input data corresponding to the reduced image when the reduced image data is included in the input data; and a reduced image data generation unit which generates the reduced image data, to be used for forming the reduced image that is judged to be recognizable by the recognizability judgment unit, based on the input data corresponding to the reduced image when the reduced image data is not included in the input data, wherein the reduced image formation unit forms the reduced image of each piece of input data on the output medium according to the reduced image data acquired by the reduced image data acquisition unit or generated by the reduced image data generation unit.

18. A non-transitory computer-readable recording medium storing computer-readable instructions that cause a computer to function as:

an input data acquisition unit which acquires input data;

a recognizability judgment unit which judges whether each reduced image to be formed corresponding to each piece of input data acquired by the input data acquisition unit is recognizable to a user or not based on the input data and size of the reduced image to be formed; and a reduced image formation unit which forms the reduced images that are judged to be recognizable by the recognizability judgment unit on the output medium while prohibiting the formation of the reduced images that are judged to be unrecognizable by the recognizability judgment unit, wherein each piece of input data includes one or more objects, wherein the reduced image corresponding to each piece of input data is made up of elements which are formed corresponding to the objects, respectively, wherein the recognizability judgment unit includes:

a selection unit which selects an object from the objects included in the input data as a judgment target;

a calculation unit which calculates a judgment value to be used for judging whether the element formed in the reduced image corresponding to the object selected by the selection unit is recognizable to the user or not;

a comparison unit which judges whether the element corresponding to the selected object is recognizable or not by comparing the judgment value calculated by the calculation unit with a prescribed value; and a repetition control unit which makes the selection unit, the calculation unit and the comparison unit to repeat the selection of an object, the calculation of the judgment value and the comparison for the next object when the element currently processed is judged to be recognizable by the comparison unit, and wherein the recognizability judgment unit judges that the reduced image of the input data as the judgment target is unrecognizable and ends the judgment regarding the input data when an element of the reduced image is judged to be unrecognizable during the repetition controlled by the repetition control unit.

19. A non-transitory computer-readable recording medium storing computer-readable instructions that cause a computer to function as:

an input data acquisition unit which acquires input data;

a recognizability judgment unit which judges whether each reduced image to be formed corresponding to each piece of input data acquired by the input data acquisition unit is recognizable to a user or not based on the input data and size of the reduced image to be formed; and a reduced image formation unit which forms the reduced images that are judged to be recognizable by the recognizability judgment unit on the output medium while prohibiting the formation of the reduced images that are judged to be unrecognizable by the recognizability judgment unit, wherein the reduced image formation unit forms a data name of the input data whose reduced image is judged to be unrecognizable by the recognizability judgment unit on the output medium.

* * * * *